June 28, 1960     H. J. JEZEK     2,942,398
CLEANER FOR COTTON STRIPPER
Original Filed Nov. 14, 1952     2 Sheets-Sheet 1

INVENTOR
HENRY J. JEZEK
BY McMorrow, Berman + Davidson
ATTORNEYS

June 28, 1960 H. J. JEZEK 2,942,398
CLEANER FOR COTTON STRIPPER
Original Filed Nov. 14, 1952 2 Sheets-Sheet 2
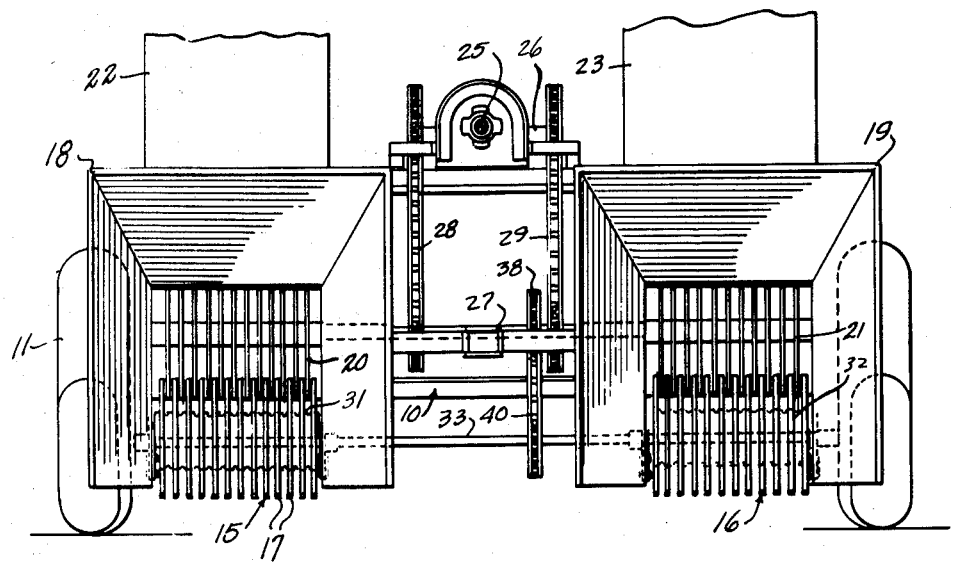
INVENTOR
HENRY J. JEZEK
BY
McMorrow, Berman + Davidson
ATTORNEYS United States Patent Office 2,942,398
Patented June 28, 1960

2,942,398
CLEANER FOR COTTON STRIPPER

Henry J. Jezek, Reagan, Tex., assignor of one-half to Louis F. Jezek, Temple, Tex.

Substituted for abandoned application Ser. No. 320,386, Nov. 14, 1952. This application Sept. 19, 1958, Ser. No. 762,067

3 Claims. (Cl. 56—34)

This invention relates to agricultural machines for stripping cotton bolls from cotton plants and collecting the stripped bolls and more particularly to a cleaning attachment for such a machine to maintain the stripping fingers or tines free of debris and other material which would interfere with their efficient operation.

It is among the objects of the invention to provide a cleaning attachment for a cotton stripping machine which attachment can be mounted on an existing machine adjacent the boll stripping fingers thereof and driven from the machine with no material modification of the machine construction; which includes rotatable beaters disposed adjacent the proximal ends of the stripping fingers of the machine at the under sides of the fingers for dislodging debris from the spaces between the adjacent fingers and pulling the dislodged debris clear of the fingers; which prevents debris, such as pieces of stems and stalks of cotton plants and weeds and vines from packing in the spaces between adjacent stripping fingers near the proximal ends of the fingers and reducing the operating efficiency of the stripping fingers; and which is simple and durable in construction, economical to manufacture, easy to install, and positive and effective in operation.

Other objects and advantages will become apparent from a consideration of the following description and the appended claims in conjunction with the accompanying drawings, wherein:

Figure 2 is a front elevational view of the cotton stripping machine and cleaning attachments illustrated in Figure 1;

Figure 3 is a longitudinal cross sectional view along line 3—3 of Figure 1 of the cleaning attachments separated from the stripping machine; and Figure 4 is a transverse cross sectional view on an enlarged scale on the line 4—4 of Figure 3.

Figure 1:
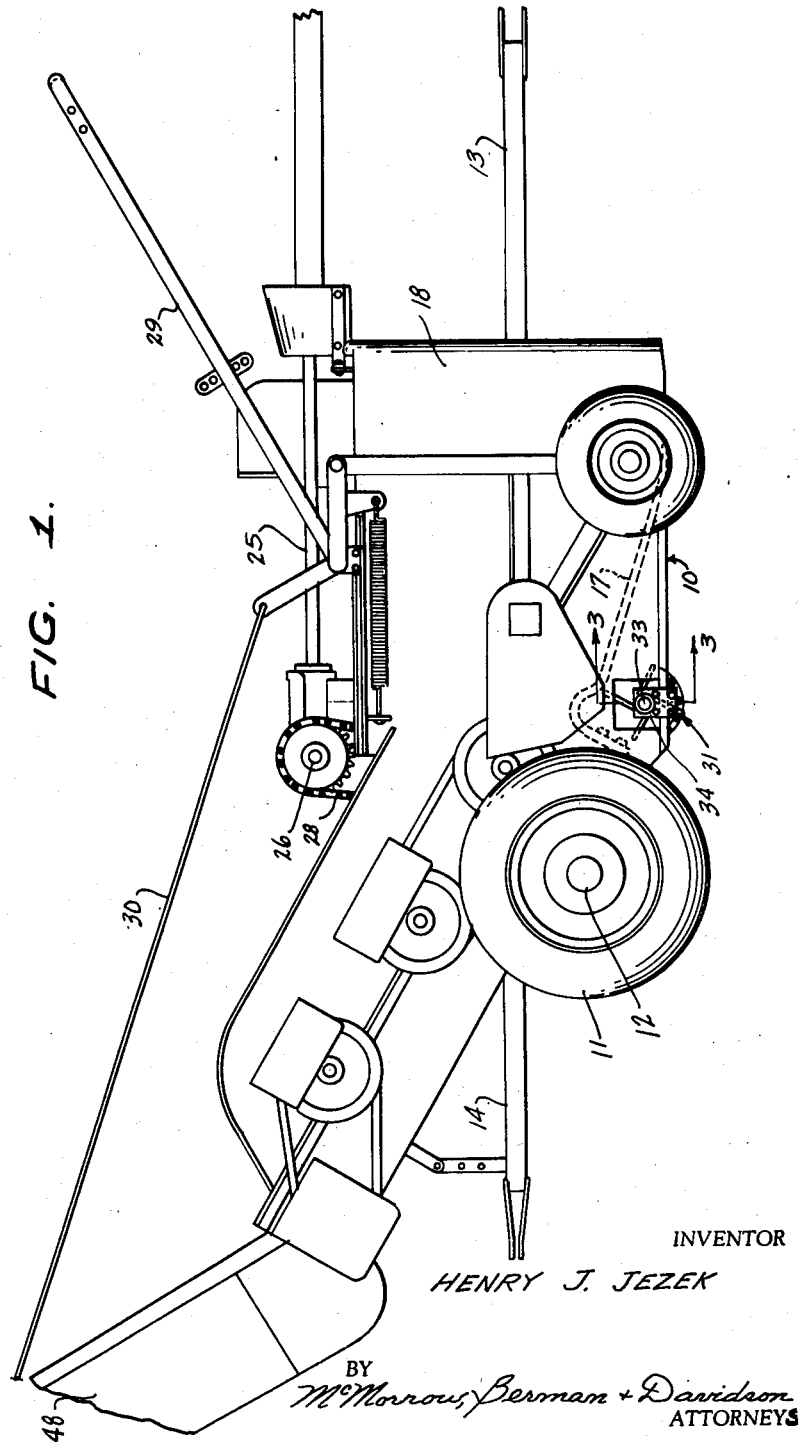
Figure 1 is a side elevational view of a cotton stripping machine of known construction with cleaning attachments illustrative of the invention operatively installed thereon.

With continued reference to the drawings, the stripping machine has a frame 10 supported by wheels 11 journaled on an axle 12 and has a towing tongue 13 projecting forwardly from the frame for attaching the machine to a towing vehicle, such as an agricultural tractor, and a tongue 14 projecting rearwardly from the frame for attaching to the machine a trailing vehicle, such as a wagon for receiving the separated cotton bolls from the machine.

Two groups, generally indicated at 15 and 16, of stripping fingers are secured to the machine frame in spaced apart relationship so that the machine will strip two rows of cotton plants at the same time and these fingers are secured at their proximal or rearward ends to the machine frame and are inclined downwardly and forwardly from their proximal ends and disposed in spaced apart and substantially parallel relationship to each other. The spaces between adjacent stripping fingers 17 is such that when a cotton plant passes between two adjacent fingers the cotton bolls will be stripped from the plant, but the plant itself will pass between the fingers and remain rooted in the ground.

Rectangular housings 18 and 19 of somewhat funnel shape respectively surround the groups 15 and 16 of stripping fingers and are open at their front and bottom sides, these housings being effective to guide the cotton plants to be stripped of bolls to the stripping fingers.

Reels 20 and 21 are mounted adjacent the groups 15 and 16 of stripping fingers and each of these reels comprises a central shaft journaled on the machine frame above the corresponding fingers intermediate the length of the latter and arms projecting from each shaft at spaced apart locations therealong and at angularly spaced apart locations therearound and adapted to work in the spaces above adjacent fingers to force the cotton bolls gathered on the fingers rearwardly of the groups of fingers and into the boll collecting ducts 22 and 23 leading from the rear ends of the housings 18 and 19.

A common shaft 27 extends between and connects the two reels 20 and 21 and a power shaft 25 extends longitudinally of the machine between the top portions of the housings 18 and 19 and forwardly of the machine for connection to the power take-off connection of the towing tractor. The power shaft 25 is drivingly connected to a shaft 26 disposed substantially at right angles to the power shaft at substantially the same level and this shaft 26 is drivingly connected to the shaft 27 by chain sprockets mounted one on each end of the shaft 26, chain sprockets mounted on the shaft 27 in spaced apart relationship to each other and chains 28 and 29 connecting the sprockets on shaft 26 to the corresponding sprockets on shaft 27.

The shaft 27 is connected between and drives the reels 20 and 21 and may be drivingly connected to other machine components, such as blowers or elevators.

The fingers 17 are in the form of elongated metal bars spaced apart so that cotton plants will pass through the spaces between adjacent bars and the bolls will be stripped from the plants leaving the plants still rooted in the ground. The bolls stripped from the plants are picked up by the reels 20 and 21 and driven rearwardly into the ducts 22 and 23 through which they are moved to an elevator 48 at the rear of the machine. This elevator 48 is controlled by manually operated means including the lever 29 and link 30 to deposit the bolls into a wagon towed by the stripping machine. During the stripping of the bolls from the plants, debris in the form of broken pieces of plant stems, plant leaves, weed and rank cotton stalks and earth accumulates in the spaces between adjacent stripping fingers and is packed in these spaces at the closed ends thereof at the distal ends of the fingers where the fingers are secured to the machine frame. This packing of debris in the spaces between the fingers shortens the length of these spaces and greatly reduces the operating efficiency of the fingers. The cleaning attachment of the present invention is provided to prevent debris from packing in the spaces between adjacent stripping fingers and to maintain the full operating efficiency of the fingers.

The cleaning attachment comprises, in general, a pair of rotatable beaters 31 and 32 journaled on the frame immediately below the stripping fingers of the groups 15 and 16, near the proximal ends of these fingers and extending transversely of the finger groups 15 and 16. These beaters are driven from the shaft 27 and are effective to dislodge debris from the spaces between adjacent picking fingers and remove such debris from the finger groups.

The attachment comprises a shaft 33 which is common to the two beaters 31 and 32 and is disposed below and substantially parallel to the shaft 27. Bearing brackets 34 and 35 are mounted on the machine frame 10 at respectively opposite sides of the finger group 15 and receive the shaft 33 at spaced apart locations along this shaft and the beater 31 is mounted on the shaft between these bearing brackets 34 and 35. Bearing brackets 36 and 37 are also mounted on the frame 10 at opposite sides of the finger group 16 and these brackets 36 and 37 also receive the shaft 33 at spaced locations therealong. So, the shaft 33 is journaled in the bearings of the bearing brackets 34, 35, 36 and 37. The beater 32 is disposed between the bearing brackets 36 and 37 and both of the beaters 31 and 32 are simultaneously rotated when the shaft 33 is driven. A chain sprocket 38 is mounted on the shaft 27 and a complementary chain sprocket 39 is mounted on the shaft 33 between the bearing brackets 35 and 36. A chain 40 drivingly connects the sprockets 38 to the sprocket 39 so that the shaft 33 and the beaters 31 and 32 are driven whenever the machine shaft 27 is driven.

Each of the beaters 31 and 32 comprises a sleeve formation or hub 41, as shown in Figure 4, receiving the shaft 33 between the corresponding bearing brackets and plates, as indicated at 42, 43, 44 and 45 extending longitudinally of the sleeve formation 41 and projecting tangentially therefrom at angular intervals of substantially ninety degrees around the sleeve formation. These plates 42 to 45 inclusive are preferably formed of steel and have a width such that their outer edges clear the under sides of the adjacent picking fingers 17 by a small clearance when the beaters are rotated, the outer edges of the plates being brought as close to the under side of the fingers as is practically possible without having them strike the fingers. These plates are serrated or scalloped along their outer edges, as indicated at 46, providing notches which partially receive the picking fingers as the beaters are rotated and projections between the notches which extend into the spaces between adjacent fingers to strike any debris accumulated in these spaces and dislodge the debris from the fingers.

As the beaters 31 and 32 are substantially identical in construction, the above detailed description of the beater 31 is considered sufficient for the purposes of the present disclosure.

While the cleaning mechanism has been illustrated and hereinabove described as including beaters each of which has four plates or blades spaced apart at angular intervals of approximately ninety degrees with both beaters mounted on a common shaft, it is to be understood that the number of plates or blades in each beater may be varied and that the beaters may be mounted on individual shafts independently connected to the machine shaft 27 without in any way exceeding the scope of the invention.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

This application is a substitute for application Serial No. 320,386, filed November 14, 1952 and now abandoned.

What is claimed is:

1. For use with a group of stripper fingers, a cleaner embodying a rotatable beater adapted to be positioned below and adjacent to and spaced from said fingers and extend transversely of said fingers, said beater including a hub adapted to extend from one end to the other end of said group, and a plurality of plates projecting tangentially in spaced relation from the perimeter of said hub and extending longitudinally along said hub, the outer edges of said plates being arranged so that they just clear the under side of the adjacent stripping fingers.

2. For use with a group of stripper fingers, a cleaner embodying a rotatable beater adapted to be positioned below and adjacent to and spaced from said fingers and extend transversely of said fingers, said beater including a hub adapted to extend from one end to the other end of said group, and a plurality of plates projecting tangentially in spaced relation from the perimeter of said hub and extending longitudinally along said hub, the outer edges of said plates being arranged so that they just clear the under side of the adjacent stripping fingers, each of said plates having serrations extending along the outer edge thereof.

3. For use with a group of stripper fingers, a cleaner embodying a rotatable beater adapted to be positioned below and adjacent to and spaced from said fingers and extend transversely of said fingers, said beater including a hub adapted to extend from one end to the other end of said group, and a plurality of plates projecting tangentially in spaced relation from the perimeter of said hub and extending longitudinally along said hub, the outer edges of said plates being arranged so that they just clear the under side of the adjacent stripping fingers, each of said plates having serrations extending along the outer edge thereof, the high points of the serrations extending into the spaces between adjacent fingers.

References Cited in the file of this patent

UNITED STATES PATENTS

| | | |
|---|---|---|
| 1,615,330 | Key | Jan. 25, 1927 |
| 2,544,411 | Altgelt | Mar. 6, 1951 |
| 2,691,862 | Johnson | Oct. 19, 1954 |
| 2,830,424 | Fowler | Apr. 15, 1958 |